US008202095B2

(12) United States Patent
Shankle et al.

(10) Patent No.: US 8,202,095 B2
(45) Date of Patent: Jun. 19, 2012

(54) COGNITIVE FUNCTION INDEX

(75) Inventors: William Rodman Shankle, Corona Del Mar, CA (US); Timothy Chan, Aliso Viejo, CA (US); Dennis Earle Fortier, Laguna Niguel, CA (US); Junko Hara, Corona Del Mar, CA (US); Tushar Mangrola, Corona Del Mar, CA (US)

(73) Assignee: Medical Care Corporation, Newport Beach, CA (US)

( * ) Notice: Subject to any disclaimer, the term of this patent is extended or adjusted under 35 U.S.C. 154(b) by 1127 days.

(21) Appl. No.: 11/957,326

(22) Filed: Dec. 14, 2007

(65) Prior Publication Data

US 2009/0155754 A1   Jun. 18, 2009

(51) Int. Cl.
*G09B 19/00* (2006.01)

(52) U.S. Cl. .................... 434/236; 600/300; 128/920
(58) Field of Classification Search .......... 434/236–238; 600/300
See application file for complete search history.

(56) References Cited

U.S. PATENT DOCUMENTS

| 6,225,920 | B1 | 5/2001 | Dayle | |
| 6,820,037 | B2* | 11/2004 | Simon | 702/182 |
| 6,884,078 | B2* | 4/2005 | Wiig et al. | 434/236 |
| 7,311,666 | B2* | 12/2007 | Stupp et al. | 600/300 |
| 2005/0142524 | A1* | 6/2005 | Simon et al. | 434/236 |
| 2005/0187436 | A1* | 8/2005 | Doniger et al. | 600/300 |
| 2006/0252014 | A1* | 11/2006 | Simon et al. | 434/236 |

FOREIGN PATENT DOCUMENTS

| EP | 1323377 A2 | 7/2003 |
| JP | 2002078699 | 3/2002 |

OTHER PUBLICATIONS

NPL__Neurotrax__2003.pdf, p. 1-25.*
NPL__NeuroTrax__report.pdf, p. 1-9.*
Cho A., Sugimura M., Nakano S., Yamada T., "Early Detection and Diagnosis of MCI Using the MCI Screen Test", The Japanese Journal of Clinical and Experimental Medicine (2007); 84(8): 1152-1160 (with English language Abstract). Department of Neurology, Fukuoka University, Japan.

(Continued)

*Primary Examiner* — Sam Yao
*Assistant Examiner* — Marie Archer
(74) *Attorney, Agent, or Firm* — Fish & Richardson P.C.

(57) ABSTRACT

Methods, systems, and apparatus, including medium-encoded computer program products, for creating a cognitive function index. In one aspect, a method includes receiving first information concerning a person, the first information specifying the person's responses, and lack thereof, for components of a cognitive test administered to the person; generating a cognitive function score for the person by comparing the first information with second information concerning a group of people to whom the cognitive test has been administered; converting the cognitive function score to a value in an index comprising a range of values, wherein a first portion of the range corresponds to a cognitively impaired zone, a second portion of the range corresponds to a cognitively normal zone, and a third portion of the range corresponds to a zone of uncertainty defined by a confidence interval centered on a mid-point of the index; and providing the indexed value for the person.

24 Claims, 7 Drawing Sheets

OTHER PUBLICATIONS

Hara, J. and Shankle, W.R., "Estimating Overall Alzheimer's Disease Risk with Evidenced-Based Methods: Toward Prevention", The 10th International Conference on Alzheimer's Disease and Related Disorders, Poster Presentation, Madrid, Spain. Jul. 2006. (pp. 1-7).

Kivipelto, M., et al., "Risk Score for the prediction of dementia risk in 20 years among middle aged people: a longitudinal, population-based study." Lancet Neural. vol. 5, pp. 735-741 [Published online Aug. 3, 2006].

Ngandu, T., et al., "The dementia Risk Score—A Practical Tool to Predict Dementia Risk in 20 Years Among Middle Aged Persons." The $10^{th}$ International Conference on Alzheimer's Disease and Related Disorders, Poster Presentation, Madrid, Spain. Jul. 2006. (1 page).

Reisberg B. "Functional assessment staging (FAST)." Psychopharmacol Bull 1988;24(4):653-9. Published by MedWorks Media Global, LLC, 1048 17th Street, Suite E, Santa Monica Ca.

Sclan SG, Reisberg B. "Functional assessment staging (FAST) in Alzheimer's disease: reliability, validity, and ordinality." Int Psychogeriatr 1992;4(S1):55-69. Springer Publishing, Inc., New York, NY.

Shankle, et al., "Early Detection of Alzheimer's Disease and Related Disorders in Primary Care Practice," American Academy of Family Physician, Overview of Oral Presentation, San Francisco, California. Oct. 2005. (2 pages).

Shankle, W. R., "Toward Prevention of Alzheimer's Disease and Related Disorders: Risk Factor and Treatment Identification With Evidenced-Based Medicine", Alzheimer's Prevention Conference, Poster Presentation, Chicago, Illinois. Jun. 2005. (6 pages).

Shankle, W. R., Romney, A. K., Hara, J., Fortier, D., Dick, M., Chen, J., Chan, T., Sun, S., "Methods to improve the detection of mild cognitive impairment", PNAS, vol. 102, No. 13, pp. 4919-4924, 2005. Published by National Academy of Sciences, Washington, D.C.

Shankle, W.R. and Hara, J., "Large Sample Analyses of AD and ADRD Risk Factors", Alzheimer's Association International Conference on Prevention of Dementia, Poster Presentation, Washington DC, Jun. 2007. (pp. 1-10).

Trenkle, D., Shankle WR, Azen SP, "Detecting Cognitive Impairment in Primary Care: Performance Assessment of Three Screening Instruments" Journal of Alzheimer's Disease, 11(3):323-335, 2007. Published by IOS Press, Amsterdam, The Netherlands.

Weller SC, Romney AK. "Metric Scaling: Correspondence Analysis." Newbery Park, CA: SAGE Publications; pp. 1-95. 1990.

Kwong, Yongkyong, Authorized Office, Korean Intellectual Property Office, PCT/US2007/087656, International Search Report and Written Opinion, mailed Aug. 27, 2008, 10 pages, to be published by USPTO.

* cited by examiner

COGNITIVE FUNCTION INDEX

BACKGROUND

This specification relates to scoring the cognitive function of a person to whom a cognitive test has been administered.

Various techniques have been used to measure the cognitive function of a person. For example, the National Institute of Aging's Consortium to Establish a Registry of Alzheimer's Disease (CERAD) has developed a ten word list as part of the Consortium's neuropyschological battery. The CERAD word list (CWL) test consists of three immediate-recall trials of a ten word list, followed by an interference task lasting several minutes, and then a delayed-recall trial with or without a delayed-cued-recall trial. The CWL is usually scored by recording the number of words recalled in each of the four trials. A single cutoff score for the delayed-recall trial, with or without adjustment for demographic variables, is typically used to determine whether cognitive impairment exists.

Some have proposed various improvements to the CWL. In addition, the CWL and the improvements thereof have been used to provide memory performance testing services, via the Internet, to clinicians in daily practice. Such services allow rapid testing of individual patients and reporting on the results of such testing. Previous reports for individual cognitive performance test results have included a statement of whether the patient has been found to be normal or to have cognitive impairment.

SUMMARY

This specification describes technologies relating to scoring the cognitive function of a person to whom a cognitive test has been administered.

In general, one or more aspects of the subject matter described in this specification can be embodied in one or more methods that include receiving first information concerning a person, the first information specifying the person's responses, and lack thereof, for components of a cognitive test administered to the person; generating a cognitive function score for the person by comparing the first information with second information concerning a group of people to whom the cognitive test has been administered; converting the cognitive function score to a value in an index comprising a range of values, wherein a first portion of the range corresponds to a cognitively impaired zone, a second portion of the range corresponds to a cognitively normal zone, and a third portion of the range corresponds to a zone of uncertainty defined by a confidence interval centered on a mid-point of the index; and providing the indexed value for the person. Other embodiments of this aspect include corresponding systems, apparatus, and computer-readable media encoding computer program product(s) operable to cause data processing apparatus to perform the operations.

These and other embodiments can optionally include one or more of the following features. The converting can include determining an appropriate one of the zones for the person based on the cognitive function score and the confidence interval; and mapping the cognitive function score into the appropriate zone based on the portion of the range corresponding to the appropriate zone. The method can include: receiving third information concerning the person, the third information including one or more older cognitive function scores for the person, the one or more older cognitive function scores being separated from the newer cognitive function score by a time period; calculating an expected change between the one or more older cognitive function scores and the newer cognitive function score based on an age of the person, the time period, and the second information; and identifying whether a change between the one or more older cognitive function scores and the newer cognitive function score falls outside the expected change. Calculating the expected change can include calculating the expected change based further on gender and education level of the person. Calculating the expected change can include using one or more statistical estimation methods.

The method can include: determining a cognitive function score cut-point based on data for the group of people to whom the cognitive test has been administered; calculating the confidence interval centered on the cognitive function score cut-point, wherein the confidence interval is at least a 95% confidence interval; determining a minimum cognitive function score for persons classified as impaired and a maximum cognitive function score for persons classified as normal; and calculating the third portion of the range based on the cognitive function score cut-point, the mid-point of the index, the confidence interval, and a difference between the maximum cognitive function score and the minimum cognitive function score. The converting can include: if the cognitive function score for the person falls below the confidence interval, mapping the cognitive function score into the first portion of the range based on the minimum cognitive function score and a lower end of the confidence interval; if the cognitive function score for the person falls above the confidence interval, mapping the cognitive function score into the second portion of the range based on the maximum cognitive function score and a higher end of the confidence interval; and if the cognitive function score for the person falls on the confidence interval, mapping the cognitive function score into the third portion of the range based on the confidence interval. Moreover, the confidence interval can be at least a 98% confidence interval or at least a 99% confidence interval.

The cognitive test can include a test of memory performance including multiple item recall trials including at least one immediate free recall trial and at least one delayed free recall trial, and the first information can specify which items were recalled and which items were not recalled by the person in the multiple item recall trials. In addition, the mid-point of the index can include a numerical mid-point of the range, the range of values can consist of numbers between zero and one hundred, inclusive, and the mid-point can be fifty.

Particular embodiments of the subject matter described in this specification can be implemented to realize one or more of the following advantages. A cognitive function index can be created that simplifies the reporting process for subjects to whom a cognitive test has been administered. The cognitive function index can indicate a general aspect of cognitive function or more specific aspect(s) of cognitive function, such as memory performance. The index can clearly show whether a subject is impaired or normal, with respect to the cognitive test, on an overall standardized scale, while also retaining and presenting elements of the statistical analysis that underlies the reported index value. The indexing techniques can be used with various cognitive assessments, including assessment of mild dementia and mild cognitive impairment, as well as more severe conditions.

A memory performance index score can offer a granular measurement of word recall pattern(s) (for both recalled and non-recalled words) compared to normal/impaired classification. Such index scores can be used to improve the detection of pathological change in an individual that was previously cognitively normal, as well as for distinguishing treatment effects or efficacy and disease progression from those due to normal aging. A scoring method that emphasizes early stage discrimination of memory decline due to normal aging from memory impairment due to underlying medical conditions can be used. Moreover, a quantification of the word recall and non-recall pattern, as described, can offer a more useful and intuitive understanding of overall memory function, and can enable precise measurement of longitudinal changes in a given subject.

The scoring method can also be used to study changes in populations of normal individuals longitudinally to better characterize normal aging. The scoring method can be used to differentiate different causes of cognitive impairment, such as those due to Alzheimer's vs. non-Alzheimer's disease, as well as those due to cortical vs. sub-cortical causes.

The details of one or more embodiments of the subject matter described in this specification are set forth in the accompanying drawings and the description below. Other features, aspects, and advantages of the invention will become apparent from the description, the drawings, and the claims.

DETAILED DESCRIPTION

Figure 1:
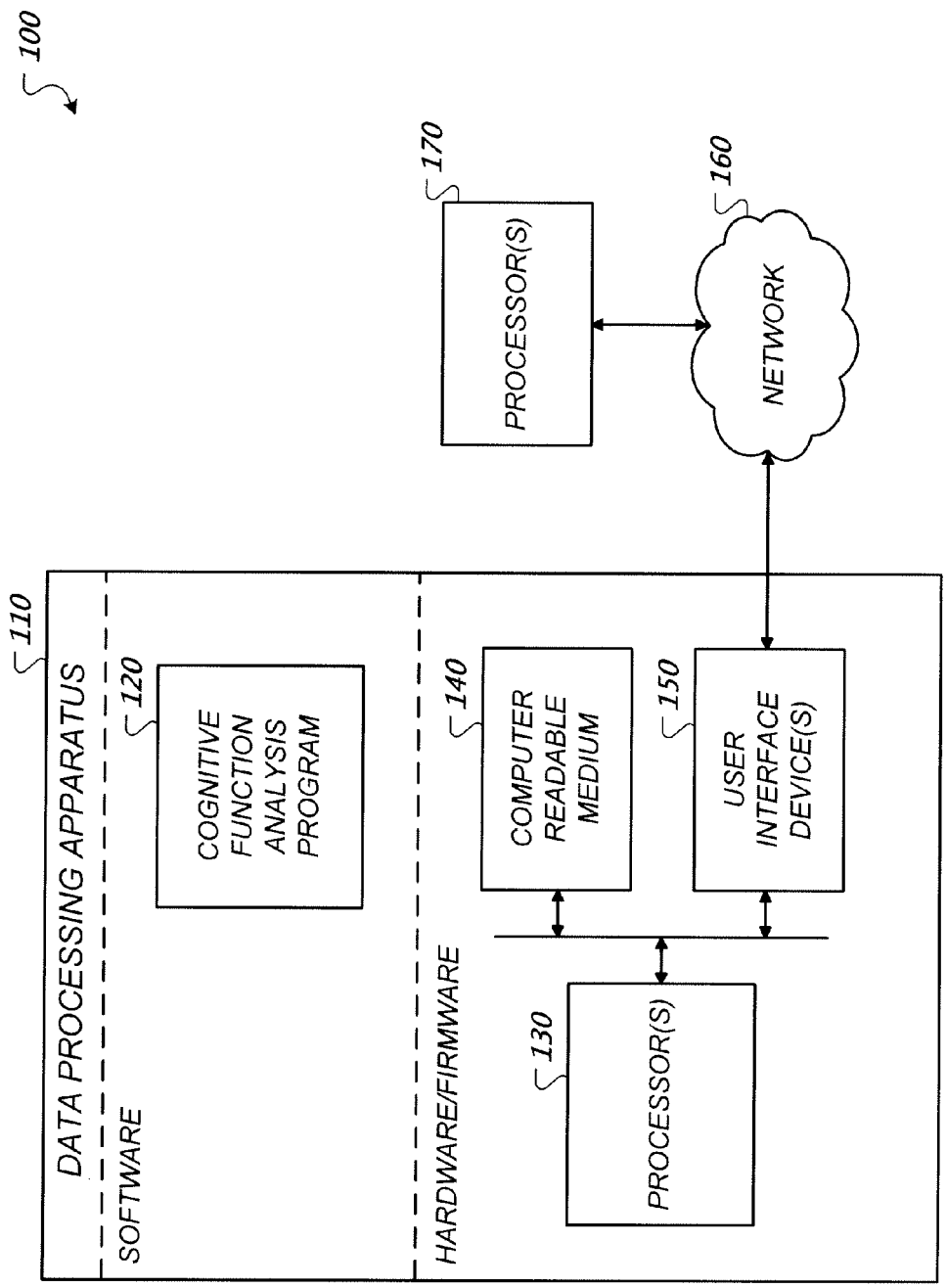
FIG. 1 shows an example system used to create a cognitive function index.

FIG. 1 shows an example system 100 used to create a cognitive function index. A data processing apparatus 110 can include hardware/firmware and one or more software programs, including a cognitive function analysis program 120. The cognitive function analysis program 120 operates in conjunction with the data processing apparatus 110 to effect various operations described in this specification. The program 120, in combination with the various hardware, firmware, and software components of the data processing apparatus, represents one or more structural components in the system.

The program 120 can be an application for determining and performing analysis on data collected to assess the cognitive function of a subject. An application refers to a computer program that the user perceives as a distinct computer tool used for a defined purpose. An application can be built entirely into an operating system or other operating environment, or it can have different components in different locations (e.g., a remote server). The program 120 can include or interface with other software such as database software, testing administration software, data analysis/computational software, and user interface software, to name a few examples. User interface software can operate over a network to interface with other processor(s). For example, the program 120 can include software methods for inputting and retrieving data associated with a cognitive assessment test, such as score results, or demographic data. The program 120 can also effect various analytic processes, which are described further below.

The data processing apparatus includes one or more processors 130 and at least one computer-readable medium 140 (e.g., random access memory, storage device, etc.). The data processing apparatus 110 can also include one or more user interface devices 150. User interface devices can include display screen(s), keyboard(s), a mouse, stylus, modems or other networking hardware/firmware, or any combination thereof to name a few examples. The subject matter described in this specification can also be used in conjunction with other input/output devices, such as a printer or scanner. The user interface device can be used to connect to a network 160, and can furthermore connect to a processor or processors 170 via the network 160 (e.g., the Internet).

Therefore, a user of the analysis program 120 does not need to be local, and may be connecting using a web browser on a personal computer, or using other suitable hardware and software at a remote location. For example, a clinician at a testing center can access a web interface via the remote processor 170 in order to input test data for a cognitive test. The test data can be the results of an already administered test, or the test data can be the information exchanged when actually administering the cognitive test using a network based testing system. In any event, data can be transmitted over the network 160 to/from the data processing apparatus 110. Furthermore the clinician can input test data and retrieve analysis based on that data or other data stored in a database. Note that the data processing apparatus 110 can itself be considered a user interface device (e.g., when the program 120 is delivered by processor(s) 170 as a web service).

Figure 2:
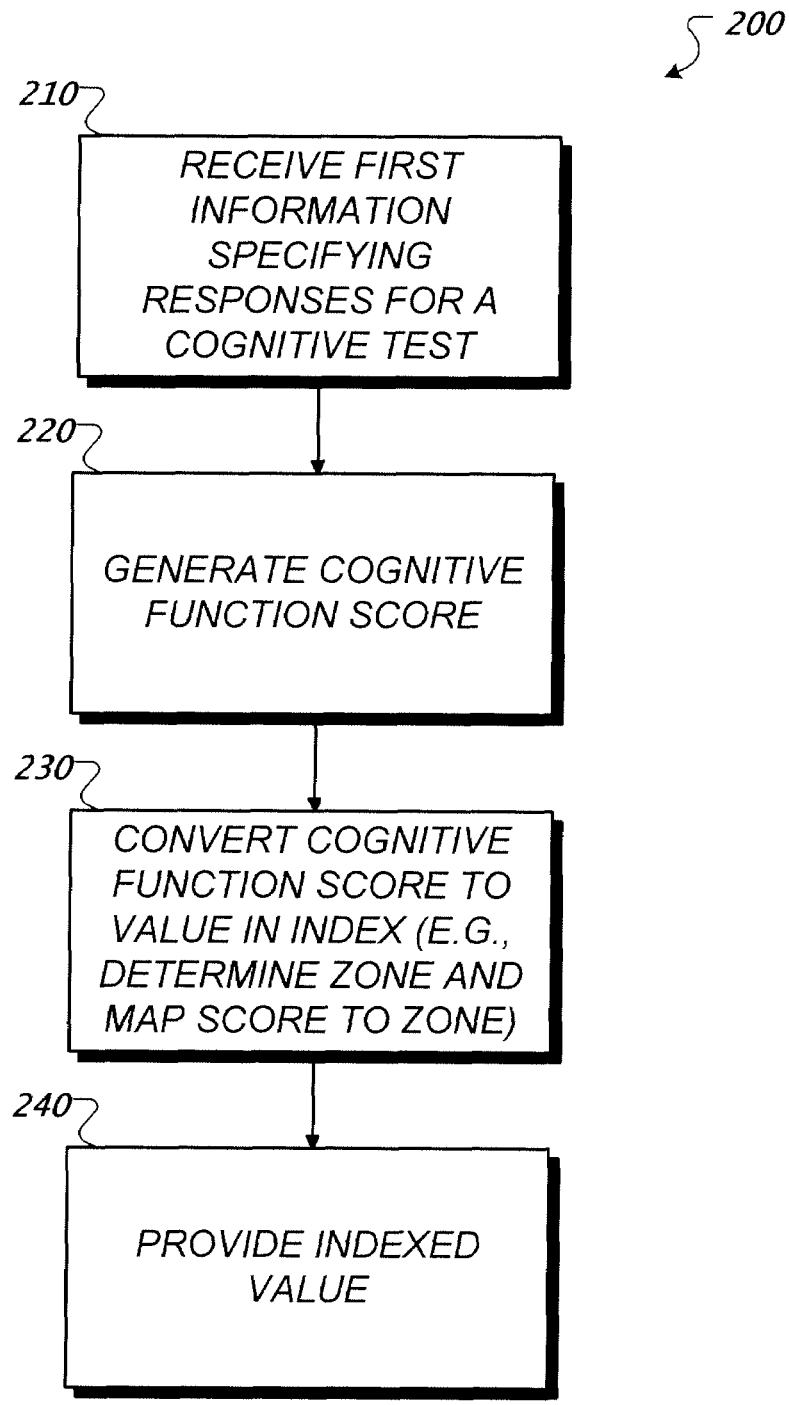
FIG. 2 shows an example process used to create a cognitive function index.

FIG. 2 shows an example process 200 used to create a cognitive function index. First information is received 210, where the first information specifies responses, and lack thereof, for components of a cognitive test administered to a person. In general, the full set of information in the test should be recorded, including all components of the test and all subject responses. The information can be received 210 from a database, a network or web-enabled device, a computer readable medium, or a standard input output device on a computer system, to name just a few examples. The cognitive test can include a test of attention and recall, and the test components can include items (e.g., words) to be recalled in one or more trials. For example, a test of attention and recall can include the CERAD word list (CWL) and/or other lists of words or items.

The CWL is a test of immediate and delayed free recall and delayed cued recall that was developed by the National Institute of Aging CERAD centers in the 1980s. There are three learning trials in which the subject is presented each word in the list and repeats it, then at the end of the list, recalls as many words as they can. The subject is not instructed to recall the words in the order they are presented, but rather to recall as many words as they can immediately after being presented the list of ten words. They are also instructed that a few minutes after the third learning trial they will again be asked to recall as many of the words as they can without another presentation of the words. The words are presented in a different order for each learning trial. The number of words correctly recalled is recorded for each of the three learning trials. After the third learning trial, an interference task that distracts the subject from rehearsing the word list (e.g., a test of executive function) is given over a period of two to five minutes. After the interference task, the subject is asked to recall as many of the ten words as they can (delayed free recall trial). The number of words correctly recalled is recorded. After the delayed free recall trial, the subject is given a delayed recognition task. The subject is presented the ten CWL words intermixed with ten distracter words. For each word, the subject is asked whether it was one of the CWL words, and the subject's response (yes or no) is recorded.

Since the words of the trials are already known, the first information need not specify the words themselves, but rather just whether or not a given word was recalled. For example, eight word lists can be used, with each word list including ten words for learning and recall, plus ten more words for delayed-cued-recall. Four trials can be employed in the cognitive test, where one of the eight word lists can be selected for use in the test. The first set of ten words from the list can be used in the immediate and delayed free recall trials (and the words of the list can be presented in the same order in each trial, which is different than with CWL), and the second set of ten words can be used as the distracter word list for the delayed-cued-recall trial. The first information can include an eighty column binary score (i.e., an eighty bit vector) that corresponds to the responses received on the immediate and delayed free recall trials of the cognitive test. Each bit in this example indicates whether a corresponding word from a trial was recalled, or whether the corresponding word from the trial was not recalled.

For example, an eighty columns wide binary indicator matrix can be defined as follows. Each word in each trial can occupy 2 columns. The first column can be assigned a 1 if the word in the trial was recalled and a 0 if it was not recalled. The second column can be assigned a 0 if the word in the trial was recalled and a 1 if it was not recalled. Each trial with ten words thus occupies twenty columns for a total of eighty columns for the four free recall trials of the word list trials. With this arrangement, the binary indicator matrix gives a row total of forty, which permits the determination of an optimal column score for a word when it was recalled in a trial, as well as a different optimal column score when that word was not recalled in a trial, as will be described further below.

The words in each word list should be linguistically and statistically equivalent, and the words should be presented in the same order. The words on each distinct list should have the same level of intra-list associability and commonality. Each list of words should have the same level of associability and commonality with each and every other list of words.

For example, the eight word lists used can be as shown in Table 1:

In general, the words in each word list should have the same difficulty for being recalled as the other words on that list, as well as the words in the other lists. For each learning trial, the words should be presented in the same order. It will be appreciated that other data formatting approaches, as well as other cognitive tests and test components, are also possible.

Other cognitive assessment tests can include, but are not limited to other multiple word recall trials, other recall or cued recall tests of verbal or non-verbal stimuli, tests of executive function, including triadic comparisons of items, (e.g., deciding which one of three animals is most different from the other two), tests of judgment, similarities, differences or abstract reasoning, tests that measure the ability to shift between sets or perform complex motor sequences, tests that measure planning and organizational skill, tests of simple or complex motor speed, tests of language abilities including naming, fluency or comprehension, tests of visual-perceptual abilities including object recognition and constructional praxis. Examples of recorded data can include the words recalled, the words not recalled, the order of the words recalled, time delay before recall, the order in which intrusions and repetitions are recalled, and various aspects of test performance. Moreover, the cognitive test can include one or more trials performed to determine specific cognitive functions such as physical (e.g. orientation or hand-eye coordination) or perception based tests. Additional information can be obtained in order to classify the score, such as demographic information, or the date(s) of test administration, to name just two examples.

A cognitive function score is generated 220 for the person. The score can be generated by comparing the first information with second information concerning a group of people to whom the cognitive test has been administered. For example, the score can be generated using correspondence analysis, a technique that creates weighted optimal scores from the subject's full word list recall performance profile, which consists of both recalled and non-recalled patterns across multiple trials. Correspondence analysis produces an optimally weighted scored combination of values, which can be used in a logistic regression (or other statistical classification procedure) to obtain a single quantitative value.

TABLE 1

Word List

| | List 1 | List 2 | List 3 | List 4 | List 5 | List 6 | List 7 | List 8 |
|---|---|---|---|---|---|---|---|---|
| W1 | BUTTER | BEDROOM | CAKE | CLOCK | BIBLE | OAK | JAZZ | BAT |
| W2 | ARM | DOWN | PARK | SCALE | FEMALE | RANK | BUS | SAFETY |
| W3 | SHORE | MESSAGE | WISDOM | THREAT | LEGEND | TASTE | LID | COPY |
| W4 | LETTER | BIRTHDAY | MARRIAGE | SPORT | STAMP | SPRING | CRITIC | ROOF |
| W5 | QUEEN | WIND | REST | SPACE | TOOTH | BRAND | DARK | ACTOR |
| W6 | CABIN | TRUCK | NOTICE | LAYER | FAT | PROJECT | OWNER | VISIT |
| W7 | POLE | LEADER | BOAT | AMOUNT | GLOVE | SERVANT | GUEST | POOL |
| W8 | TICKET | HAT | PLANET | FLOOD | LECTURE | CUP | WEATHER | GRIEF |
| W9 | GRASS | BARN | KNEE | DOUBLE | BEAST | LIST | PEACE | SLEEVE |
| W10 | ENGINE | SOCK | TELEPHONE | RESPECT | AGENT | PLAIN | BASE | OUTCOME |
| D1 | CHURCH | WINTER | BLANKET | TOUCH | SHOW | CAMP | MUSCLE | DANCE |
| D2 | COFFEE | BAG | VEIN | FLOOR | CASH | BATHROOM | ORGAN | REGION |
| D3 | DOLLAR | BLUE | SHAPE | LEATHER | HELICOPTER | OIL | WEDDING | SMOKE |
| D4 | FIVE | ROOT | NEWSPAPER | ARROW | FLOWER | EARTH | WOOD | BLADE |
| D5 | HOTEL | TRAIL | MISSION | KID | NUT | BEEF | SUPPORT | STRESS |
| D6 | MOUNTAIN | SEED | WATCH | BUCKET | SILVER | LUNCH | PARKING | LIMIT |
| D7 | SLIPPER | HEART | LIGHT | CONFLICT | BOTTLE | PORTRAIT | BRANCH | TRIAL |
| D8 | VILLAGE | SOUP | PINT | DUST | LOYALTY | HOST | PHOTO | PENCIL |
| D9 | STRING | NOISE | CYCLE | PRESSURE | LOAD | STRUGGLE | VERSE | WIFE |
| D10 | TROOP | CREATURE | MOUTH | SPELL | DECADE | RIDE | LOUNGE | PLAYER |

W#: 10 Word List used in learning trial to be recalled
D#: Used in Delayed-Cued-Recall Trial along with the 10 Word List The following data analysis methods can be used to generate the second information for the group of people, and to compare the first and second information to generate a cognitive function score. A relatively large population of subjects (e.g., over four hundred) can be evaluated with an extensive neuropyschological test battery, with functional measures, with severity staging measures (the Clinical Dementia Rating Scale, the Functional Assessment Staging Test, and/or other measures), with laboratory testing and brain imaging. The evaluated population should include normal subjects and subjects with mild cognitive impairment, mild dementia, moderate dementia or severe dementia. Standardized criteria can be used to classify these subjects as normal aging versus mild cognitive impairment, mild dementia, moderate dementia or severe dementia. If mild cognitive impairment or dementia is found, then standardized diagnostic criteria can be used to identify the underlying cause.

Correspondence analysis can be used to analyze the cognitive test results for the subjects (e.g., the binary score vectors of the training sample), and to compute the optimal row score matrix, optimal column score matrix and the singular value matrix. Correspondence analysis is an analytical method that has been largely used in quantitative anthropology and the social sciences. Its primary function is to maximize the canonical correlation between the rows and columns of an input data matrix so that the maximum amount of information in the data can be explained. Mathematically, it is designed to provide the best linear solution to the explanation of the information in the data.

In some embodiments, correspondence analysis can be used to maximize the explanation of the information shared between individuals (normal or cognitively impaired) and their patterns of recalled plus non-recalled words in each trial. In this sense, subject scores generated by correspondence analysis represent a complex combination of the subject characteristics (both normative and non-normative) plus word list test performance metrics (e.g., words recalled, order recalled, retention time, etc.). The maximization of the explainable information can be accomplished through a singular value decomposition of the input data matrix.

Correspondence analysis reduces the dimensionality of a raw data matrix without loss of information. Tschebychev orthogonal polynomials can be used to convert the raw data matrix into an optimal row score matrix, an optimal column score matrix, and a singular value matrix of eigenvalues. These matrices can have the following statistical properties: (1) each row variable of the optimal row score matrix is a vector whose components are multivariate, normally distributed and statistically independent of each other; (2) the optimal row score vectors are also directly comparable because the effects of their marginal totals have been removed; (3) each column variable of the optimal column score matrix is a vector whose components are multivariate, normally distributed and statistically independent; (4) the optimal column score vectors are also directly comparable because the effects of their marginal totals have been removed; (5) each value in the singular value matrix is a canonical correlation between the row and column variables of the optimal score matrices; (6) the rank of these three matrices defines the number of statistically independent components needed to account for all of the explainable variance (non-noise) in the raw data. The rank is usually of much lower dimension than the number of rows or columns. This means that the transformation of the input data matrix into a set of statistically orthogonal matrices can yield a massive reduction in dimensionality while continuing to account for virtually all of the explainable information in the input data.

Thus, the optimal row scores represent the pattern of both recalled and not recalled words in each trial after removing the effect of the total number of words recalled, and the optimal column scores represent the effects of recalling or not recalling a given word in a given trial after removing the effect of the sample. In this regard, the optimal row and optimal column scores are not simple weightings of the number of words recalled, their difficulty, their order or their position in the wordlist, or the specific sample used. Rather, the optimal row and column scores provide the best linear solution to explaining the total variance (information) of the raw data.

Correspondence analysis can thus produce optimal row and column score vectors that only require a relatively small number of components (e.g., the first two components) to characterize the majority of the explainable variance of the input data matrix. These optimal row and column score vectors can be derived by the simultaneous and inseparable use of the information from both normative and non-normative cases as well as recalled and non-recalled words per trial to maximize data reduction and explanation of the total variance. The optimal column score and singular value matrices can be used for classification of future subjects, while the optimal row score matrix can be used to develop a statistical classification algorithm, such as a logistic regression classification algorithm.

Logistic regression can be used to classify the normal aging and mild cognitive impairment subjects. The candidate predictor variables can include the first two components of the optimal row score vector and other subject data, such as age, gender, education, risk profile, genetic and/or treatment information. Stepwise logistic regression can be used to identify which variables make independent contributions to the prediction of the outcome (normal or impaired). Based on this approach, it has been found that the first two components of the optimal row score vector, plus age, are significant predictor variables.

The final logistic regression classification equation can include the identified independent predictors and can be used to generate Logistic Regression Classification Score (LRCS) values for the training sample. These values can then be used with non-parametric receiver operating characteristic methods to generate the sensitivity and specificity values corresponding to different LRCS values. Optimal cut-points can then be selected to maximize specificity or sensitivity depending upon the goal of the classification. The logistic regression classification equation and the cut-points can then be used to classify new individuals from the testing sample who took the cognitive test. Moreover, the accuracy, sensitivity and specificity can be computed for the testing sample. This process of developing the classification algorithm can be repeated multiple times (e.g., 30 or more times) to generate independent training and testing samples in order to establish 95% confidence limits on the estimation of the accuracy, sensitivity and specificity for the testing samples.

When a new individual takes the cognitive test, their LRCS can be computed as follows. Multiply the subject's vector of eighty binary scores for the recalled and not recalled words from each trial by the eighty optimal column score vectors developed from the training sample. The subject's resulting optimal row score vector thus characterizes their pattern of recalled and not recalled CWL words across the multiple trials. The logistic regression classification algorithm can then be used to generate a classification score for the subject, and the optimal cut-point (selected from the receiver operating characteristic analysis) can be used to classify the subject as normal or impaired.

Although specific examples of cognitive function scoring are described above, it will be appreciated that different cognitive tests and cognitive function scoring techniques can also be used. Moreover, resulting scores can be combined and/or compared with other scores from the same or different individuals in some implementations, depending on which factors the examiner is investigating. For example, comparisons or combinations can be made with Functional Assessment Staging Test (FAST) scores. Any number of mathematical transformations can be used to generate a score from specified input variables. Therefore, the cognitive function scoring approach should not be limited to the examples provided in this specification.

The cognitive function score is converted 230 to a value in a cognitive function index. This cognitive function index includes a range of values, where a first portion of the range corresponds to a cognitively impaired zone, a second portion of the range corresponds to a cognitively normal zone, and a third portion of the range corresponds to a zone of uncertainty defined by a confidence interval centered on a mid-point of the index. The index values can be integer or radix-point numbers, such as numbers between zero and one hundred, or other values. Moreover, the number representations can change with the zones, such as by using integers in the normal and impaired zones, but decimal-point numbers in the zone of uncertainty.

The mid-point of the index can be a numerical mid-point, a mid-point in a graphical representation of the index, or a combination of these; the values in the index range can be evenly spaced or unevenly spaced. In general, the graphical representation of the index presented to the clinician can be bisected in order to make the displayed index more readily interpretable. In any case, the conversion of the cognitive function score into a value in the index can involve determining an appropriate one of the zones for the subject based on the cognitive function score and the confidence interval, and mapping the cognitive function score into the appropriate zone based on the portion of the range corresponding to the appropriate zone.

Once obtained, the indexed value is provided 240 for the person. This can involve displaying the indexed value directly, sending the indexed value for the person over a network for display on a remote computing system, or saving the indexed value in a computer-readable medium for use in further processing or reports to be generated.

Figure 7:
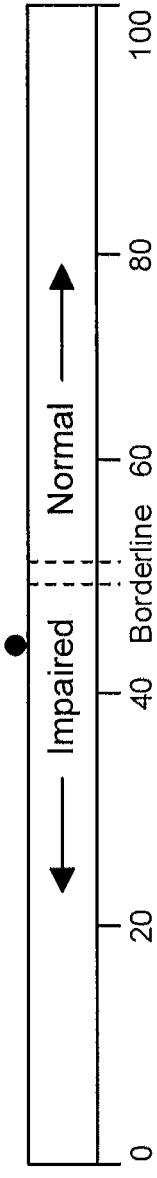
FIG. 7 shows an example report relating to cognitive impairment and including a memory performance index.

For example, FIG. 7 shows an example report 700 relating to cognitive impairment and including a memory performance index. The report contains demographic and identifying information 710, along with a timestamp 720. An overall impression 730 indicates how the patient is classified as a result of the analysis. A memory performance index score along with a graphical representation 740 shows the calculated score, including what zone the individual score falls under and the ranges for the zones. A key 750 gives a text description of the graphical representation 740, along with other information useful for interpreting the data shown. Methods for determining the score are described elsewhere in this specification. Data, including the memory performance index score may be displayed in other contexts (e.g., in a report with other analysis or with scores for specific cognitive tests) and other various mediums (e.g., a printout).

Figure 3:
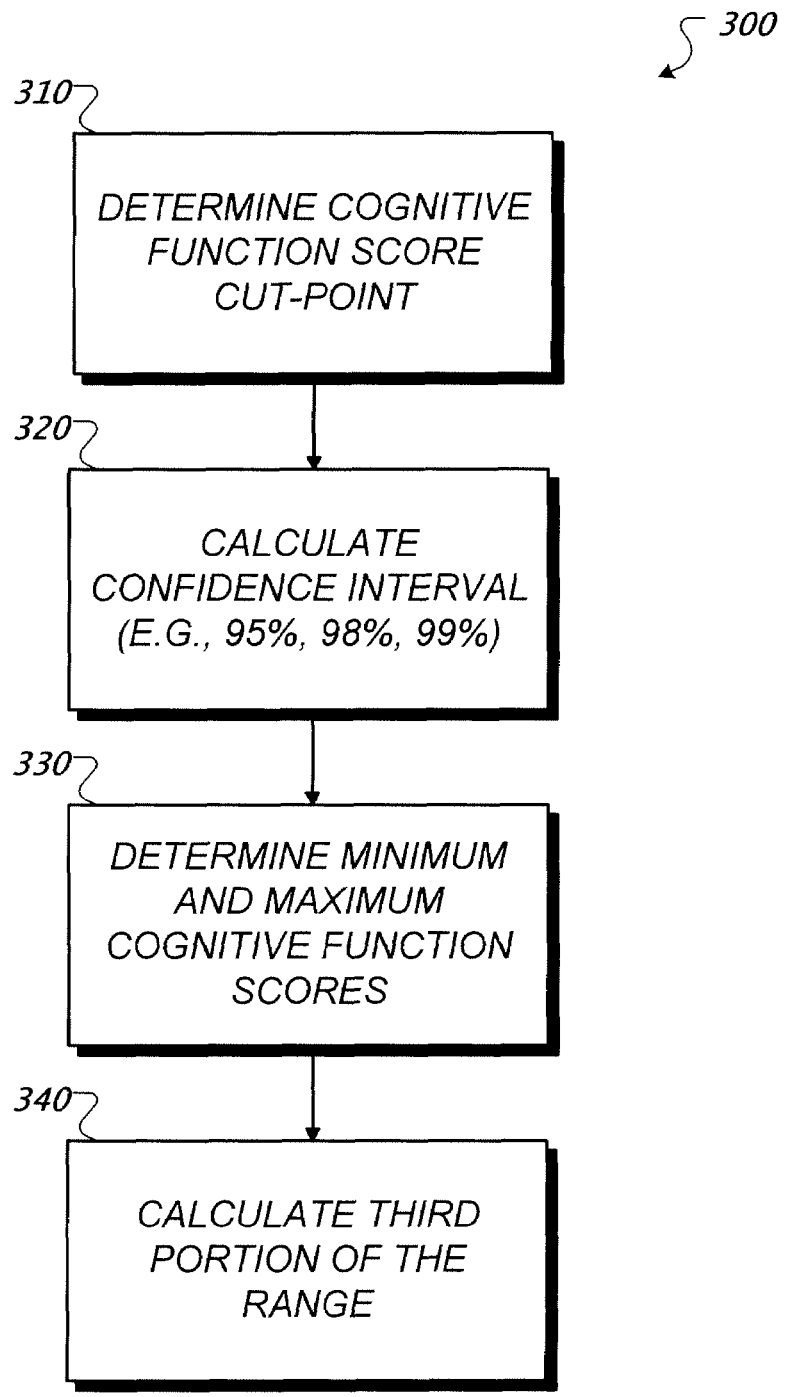
FIGS. 3 and 4 show an example process of calculating a zone of uncertainty in a cognitive function index based on a confidence interval.
Figure 4:
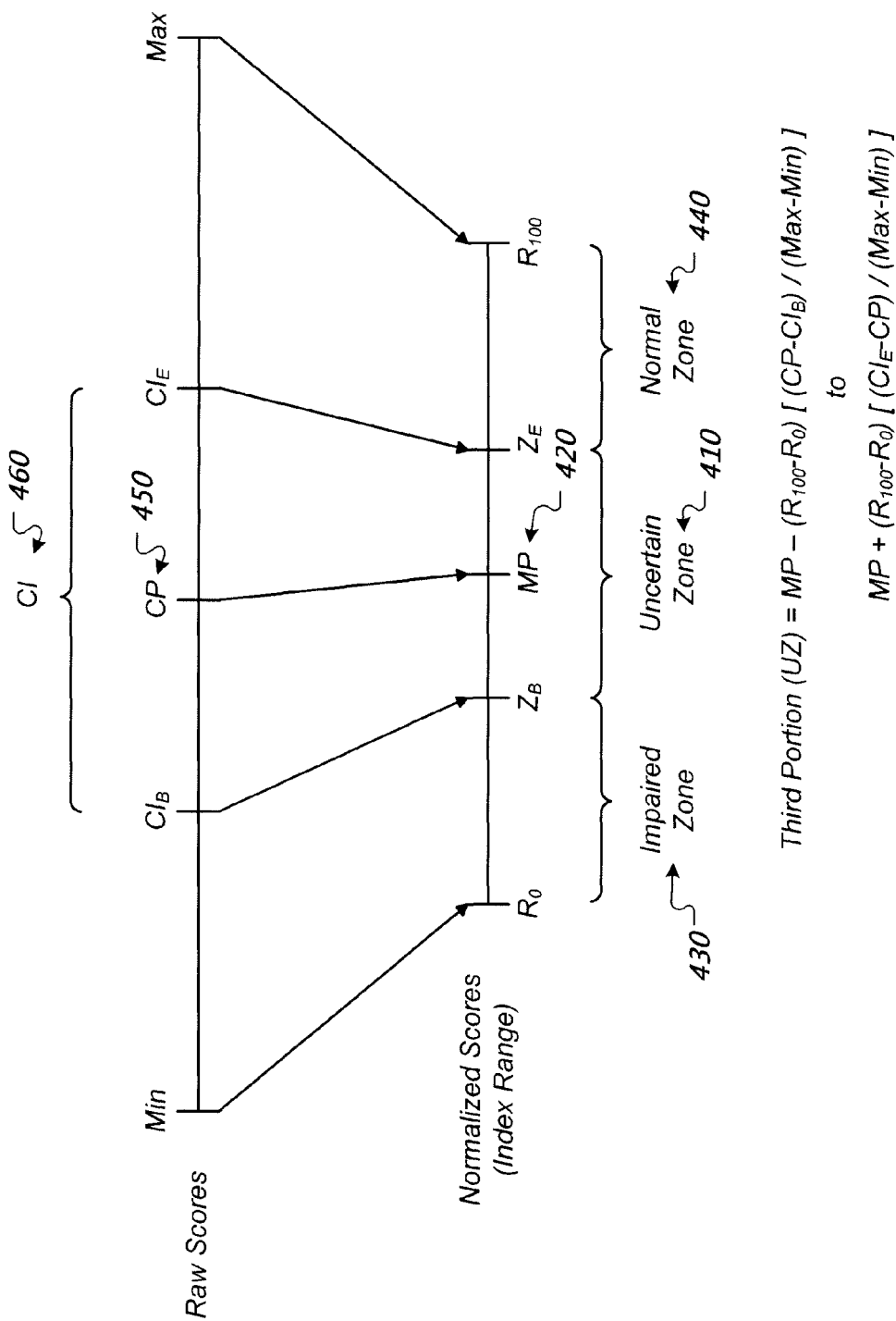

FIGS. 3 and 4 show an example process 300 of calculating a zone of uncertainty in a cognitive function index based on a confidence interval. A cognitive function score cut-point 450 is determined 310 based on data for the group of people to whom the cognitive test has been administered. For example, a logistic regression classification score (LRCS) cut-point can be selected from the non-parametric receiver operating characteristic curve analysis, as described previously.

A confidence interval 460 can then be calculated 320, centered on the cognitive function score cut-point 450. For example, the large sample of subjects (including both normal and cognitively impaired subjects) can be used to compute a confidence interval (CI) 460 centered on the LRCS cut-point 450. The CI 460 will be referred to as the cut-bar and can be a 95%, 96%, 97%, 98% or 99% confidence interval.

A minimum cognitive function score (Min) can be determined 330 for subjects classified as impaired, and a maximum cognitive function score (Max) can be determined 330 for subject classified as normal. For example, LRCS values can be computed for hypothetical individuals who are 18 and 106 years old who score 0, 0, 0, and 0 on the four word list trials. The lower of these two LRCS values can be defined as the minimum possible LRCS for individuals classified as cognitively impaired. Note that this minimum LRCS value can be a negative number. Furthermore, LRCS values can be computed for hypothetical individuals who are 18 and 106 years old who score 10, 10, 10, and 10 on the four word list trials. The higher of these two LRCS values can be defined as the maximum possible LRCS for individuals classified as normal.

A third portion of the range 410 can be calculated 340 based on the cognitive function score cut-point 450, the mid-point 420 of the index, the confidence interval 460, and a difference between the maximum cognitive function score and the minimum cognitive function score. For example, the range of the LRCS cut-bar ($CI_E$-$CI_B$) can be divided by the range of the minimum possible LRCS for impaired subjects to the maximum possible LRCS for normal subjects (Max-Min). This division defines the proportion of the full range of possible raw scores occupied by the cut-bar. The region from the lower to the upper bound of the cut-bar (the beginning of the confidence interval to the ending of the confidence interval) defines the range of raw scores that fall within the confidence interval 460 and thus correspond to a zone of uncertainty 410 in the index.

In general, the raw scores are normalized to fit within the index range, and the confidence interval 460 is used to define the zone of uncertainty 410. For example, the LRCS cut-point 450 can be mapped to the mid-point 420 (e.g., to a value of 50 in a 0-100 index). The proportion of the full range of possible LRCS values corresponding to the lower bound of the cut-bar to its center can be multiplied by the range of the index (e.g., 100). The result can be subtracted from the mid-point 420 (e.g., 50) to obtain the lower bound of the zone of uncertainty 410. Likewise, the proportion of the full range of possible LRCS values corresponding to the center of the cut-bar to its upper bound can be multiplied by the range of the index (e.g., 100), and the result can be added to the mid-point 420 (e.g., 50) to obtain the upper bound of the zone of uncertainty 410. In general, the zones can be defined as follows:

Impaired Zone 430=$R_0$ to $Z_B$

Normal Zone 440=$Z_E$ to $R_{100}$

Uncertain Zone 410=$Z_B$ to $Z_E$ $Z_B=MP-(R_{100}-R_0)[(CP-CI_B)/(Max-Min)]$ $Z_E=MP+(R_{100}-R_0)[(CI_E-CP)/(Max-Min)]$ where, $R_0$ is a selected lower bound of the index (e.g., 0), $R_{100}$ is a selected upper bound of the index (e.g., 100), and MP is a selected mid-point of the index (e.g., 50).

To convert a subject's raw score (S) into an index value can then be accomplished as follows:

Indexed Value for Impaired Zone $430 = R_0 + (Z_B - R_0)[(S - \text{Min})/(CI_B - \text{Min})]$ Indexed Value for Normal Zone $440 = R_{100} + (R_{100} - Z_E)[(S - \text{Max})/(\text{Max} - CI_E)]$ Indexed Value for Uncertain Zone $410 = MP + (Z_E - Z_B)[(S - CP)/(CI_E - CI_B)]$ Thus, if the cognitive function score for the person falls below the confidence interval 460, the score can be mapped into the first (impaired) portion of the range based on the minimum cognitive function score and a lower end of the confidence interval. If the cognitive function score for the person falls above the confidence interval 460, the score can be mapped into the second (normal) portion of the range based on the maximum cognitive function score and a higher end of the confidence interval. Finally, if the cognitive function score for the person falls on the confidence interval 460, the score can be mapped into the third (uncertain) portion of the range based on the confidence interval.

Thus, the raw score results from the analysis of the components of the cognitive test can be transformed to a simplified scale (e.g., 0 to 100) while also retaining information about the underlying statistical analysis. The zone of uncertainty 410 in the index corresponds to test results that cannot be accurately classified based on the confidence level for the test (e.g., overall classification accuracy for normal aging vs. mild cognitive impairment can be 96-97% and for normal aging vs. mild dementia can be 99-100%). Any subject whose cognitive function index value falls within the zone of uncertainty 410 is classified as borderline, in which case normal and cognitively impaired cannot be reliably distinguished. Moreover, it will be appreciated that when the index value classifies a subject as having cognitive impairment, this can be due to various possible causes, including but not limited to Alzheimer's disease, cerebrovascular disease, Parkinson's disease, lewy body disease, frontal-temporal lobe disease, traumatic brain injury, depression or other psychiatric disorder, metabolic, hematologic, nutritional, endocrinologic or infectious disorders.

Figure 5:
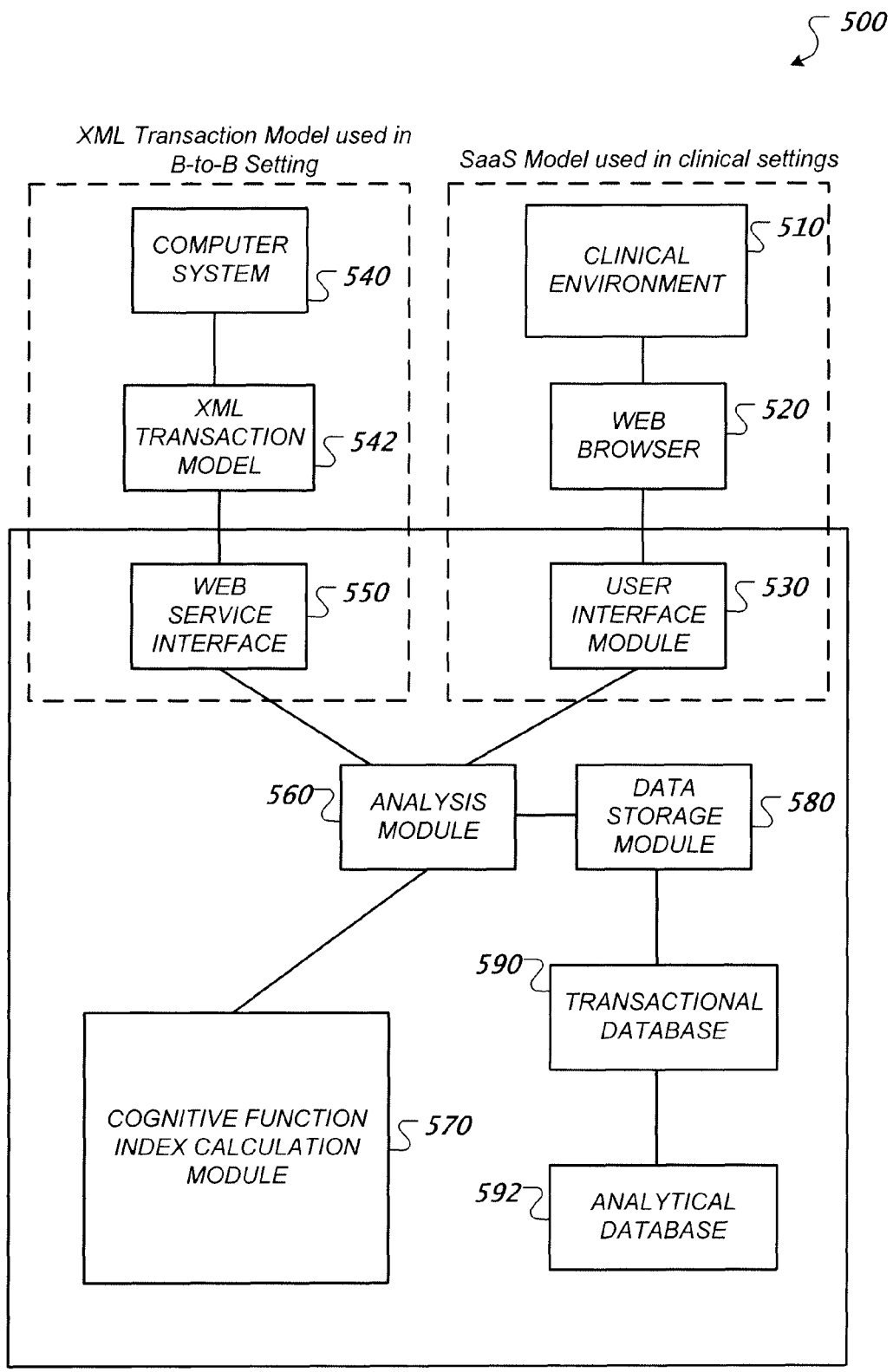
FIG. 5 shows another example system used to create a cognitive function index.

FIG. 5 shows another example system 500 used to create a cognitive function index. The example system described can perform a variety of functions including data analysis, storage and viewing, and remote access and storage capabilities useful for generating, viewing and transforming a cognitive function index. The cognitive function index can be determined using the methods described elsewhere in this specification.

A Software as a Service (SaaS) model can provide network based access to the software used to create a cognitive function index. This central management of the software can provide advantages, which are well known in the art, such as offloading maintenance and disaster recovery to the provider. A user, for example, a test administrator within a clinical environment 510, can access test administration software within the test administration system via a web browser 520. A user interface module 530 receives and responds to the test administrator interaction.

In addition, a customer's computer system 540 can access software and interact with the test administration system using an eXtensible Markup Language (XML) transactional model 542. The XML framework provides a method for two parties to send and receive information using a standards-based, but extensible, data communication model. A web service interface 550 receives and responds to the customer computer system 540 in XML format. For example, an XML transactional model can be useful for storage and retrieval of the structured data relating to the cognitive function index.

An analysis module 560 analyses inputs from the web service interface 550 and the user face module 530, and produces test results to send. The analysis module uses a cognitive function index calculation module 570 to perform the test analysis. The cognitive function index calculation module 570 can, for example, incorporate the methods described elsewhere in this specification.

A data storage module 580 transforms the test data collected by the user interface module 530, web service interface 550, and the resulting data generated by the analysis module 560 for permanent storage. A transactional database 590 stores data transformed and generated by the data storage module 580. For example, the transactional database can keep track of individual writes to a database, leaving a record of transactions and providing the ability to roll back the database to a previous version in the event of an error condition. An analytical database 592 can store data transformed and generated by the data storage module 580 for data mining and analytical purposes.

Figure 6:
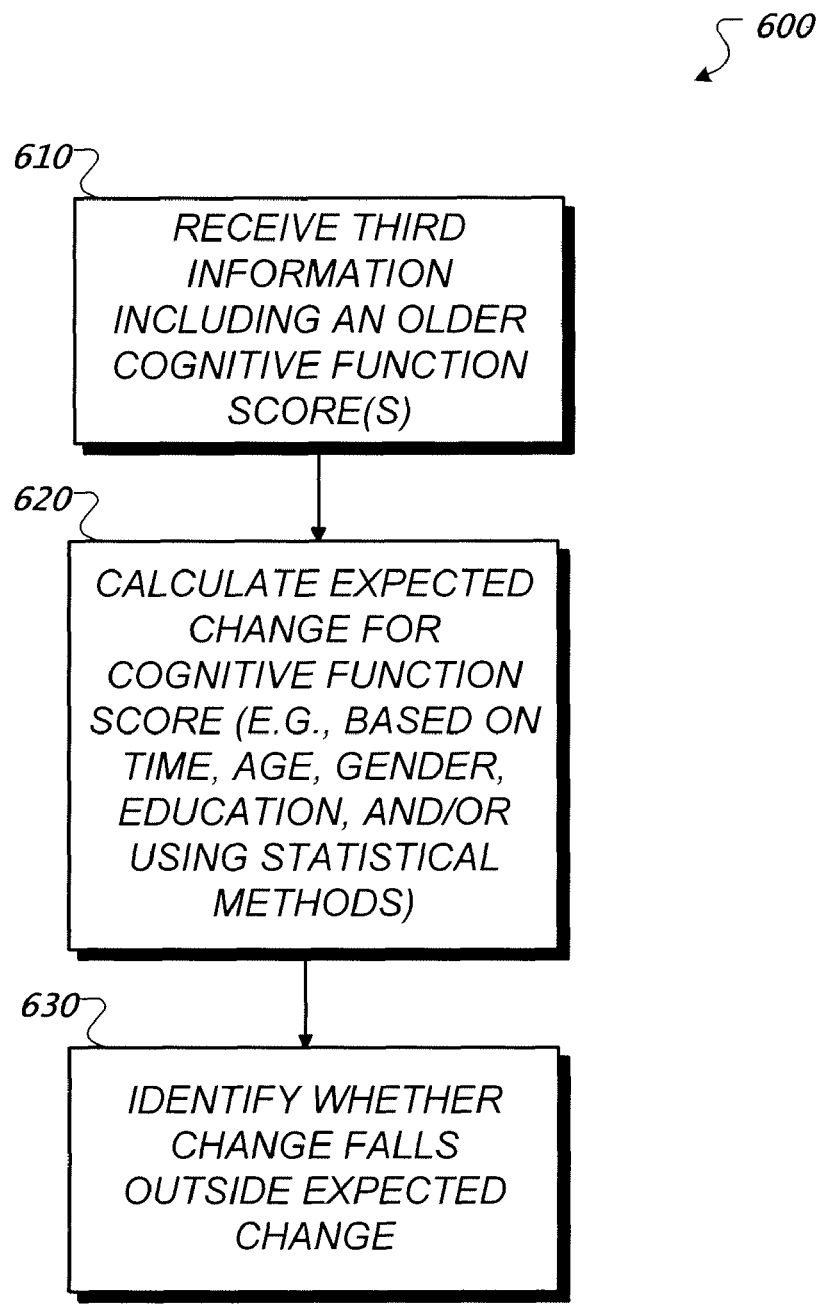
FIG. 6 shows an example process of checking a change in cognitive function score against an expected change.

FIG. 6 shows an example process 600 of checking a change in cognitive function score against an expected change. For a subject who has taken the cognitive test more than once, and consequently has multiple cognitive function scores, the expected change in that score can be computed and compared with the actual change. Thus, third information for the person can be received 610, where the third information includes older cognitive function score(s) for the person, the older cognitive function score(s) being separated from the newer cognitive function score by a time period (e.g., one or two years).

An expected change can be calculated 620 for the cognitive function score based on the time period and various additional factors (covariates). These covariates can include age, gender, education, risk profile, genetic and/or treatment information for the person. In general, the covariates used can include any variables that serve to minimize the expected change, such as the value of the previous cognitive function score, attention span, severity of any cognitively related functional impairment, diagnosis of the cause of cognitive impairment, recent treatment changes, changes in living conditions, changes in underlying medical conditions, development of new medical conditions, and time of day that the assessment was performed. The calculation can use various statistical methods, including discriminant analysis, general linear models, stepwise multivariate regression and logistic regression. For example, such statistical methods use covariates to adjust for changes in performance that would otherwise be attributed to unexplained variance, or noise, in the data. Such covariate adjustment serves to reduce the amount of unexplainable change in a cognitive function score, thereby improving the ability to detect change due to important factors such as disease progression, treatment effect, or conversion from normal to impaired cognitive function. Moreover, this calculation can be based on multiple time periods and three or more cognitive function scores.

For example, the cognitive function scores from three or more test administrations (performed at different times) can be compared, and the expected change in those scores can be adjusted for: test-retest influences on a subject's performance, the subject's age at the beginning of the time period, the duration of the time period between tests, the subject's age at the end of this time period, the mean slope of the cognitive function score due to normal aging for the age group to which the subject belongs, and/or an estimated deviation from this mean slope based on a prior distribution of cognitive function score slopes for a sample most similar to the subject. If the subject already has a known diagnosis of the cause of cognitive impairment, then diagnosis and the severity of the disease can be included to adjust for expected change in the cognitive function score. Moreover, the expected change in scores can also be adjusted based on gender, education, risk profile, genetic and/or treatment information.

Whether the actual change falls outside the expected change can be identified 630. In general, this involves interpreting whether or not the change is consistent with normal aging. For many individuals, cognitive performance declines as age increases. However, some individuals show a more rapid decline than their peers, due to disease (e.g., Alzheimer's disease), trauma or neuropyschological conditions (e.g., depression). Over time, with repeated testing, the cognitive performance differences can manifest in lower test results. If an individual's score does fall outside the expected range, that information, along with the nature, rate and onset of the neurological decline can be important factors in determining the cause of the difference. This process can be repeated on multiple cognitive function scores of an individual to establish an accurate amount or rate of change. The inclusion of covariates permits statistical methods to estimate more accurately and precisely the expected change in a cognitive function score or its transformed index.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer-readable medium. The propagated signal is an artificially generated signal, e.g., a machine-generated electrical, optical, or electromagnetic signal that is generated to encode information for transmission to suitable receiver apparatus for execution by a computer. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a cross-platform runtime environment, or a combination of one or more of them. In addition, the apparatus can employ various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

While this specification contains many implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results. The actions recited in the claims can be performed using different statistical classification procedures, such as discriminant analysis, stepwise multivariate regression or general linear models, rather than logistic regression as described above. The actions recited in the claims can be performed using different orthogonal transformations of the raw input data, such as principal components analysis, multi-dimensional scaling, or latent variable analysis, rather than correspondence analysis as described above.

What is claimed is:

1. A computer-implemented method comprising:
receiving first information concerning a person, the first information specifying the person's responses, and lack thereof, for components of a cognitive test administered to the person;
generating a cognitive function score for the person by comparing the first information with second information concerning a group of people to whom the cognitive test has been administered;
converting the cognitive function score to a value in an index comprising a range of values, wherein a first portion of the range corresponds to a cognitively impaired zone, a second portion of the range corresponds to a cognitively normal zone, and a third portion of the range corresponds to a zone of uncertainty defined by a confidence interval centered on a mid-point of the index; and
providing the value in the index for the person;
wherein the generating is based on an orthogonal transformation that maximizes canonical correlation between rows and columns of a matrix corresponding to the first information concerning the person.

2. The method of claim 1, wherein the converting comprises:
determining an appropriate one of the zones for the person based on the cognitive function score and the confidence interval; and
mapping the cognitive function score into the appropriate zone based on the portion of the range corresponding to the appropriate zone.

3. The method of claim 1, comprising:
receiving third information concerning the person, the third information comprising one or more older cognitive function scores for the person, the one or more older cognitive function scores being separated from a newer cognitive function score by a time period;
calculating an expected change between the one or more older cognitive function scores and the newer cognitive function score based on an age of the person, the time period, and the second information; and
identifying whether a change between the one or more older cognitive function scores and the newer cognitive function score falls outside the expected change.

4. The method of claim 3, wherein calculating the expected change comprises using one or more statistical estimation methods.

5. The method of claim 1, comprising:
determining a cognitive function score cut-point based on data for the group of people to whom the cognitive test has been administered;
calculating the confidence interval centered on the cognitive function score cut-point, wherein the confidence interval is at least a 95% confidence interval;
determining a minimum cognitive function score for persons classified as impaired and a maximum cognitive function score for persons classified as normal; and
calculating the third portion of the range based on the cognitive function score cut-point, the mid-point of the index, the confidence interval, and a difference between the maximum cognitive function score and the minimum cognitive function score.

6. The method of claim 5, wherein the converting comprises:
if the cognitive function score for the person falls below the confidence interval, mapping the cognitive function score into the first portion of the range based on the minimum cognitive function score and a lower end of the confidence interval;
if the cognitive function score for the person falls above the confidence interval, mapping the cognitive function score into the second portion of the range based on the maximum cognitive function score and a higher end of the confidence interval; and
if the cognitive function score for the person falls on the confidence interval, mapping the cognitive function score into the third portion of the range based on the confidence interval.

7. The method of claim 5, wherein the confidence interval is at least a 99% confidence interval.

8. The method of claim 1, wherein the cognitive test comprises a test of memory performance comprising multiple item recall trials including at least one immediate free recall trial and at least one delayed free recall trial, and the first information specifies which items were recalled and which items were not recalled by the person in the multiple item recall trials.

9. The method of claim 1, wherein the mid-point of the index comprises a numerical mid-point of the range, the range of values consists of numbers between zero and one hundred, inclusive, and the mid-point is fifty.

10. A non-transitory computer-readable medium encoding a computer program product operable to cause data processing apparatus to perform operations comprising:
receiving first information concerning a person, the first information specifying the person's responses, and lack thereof, for components of a cognitive test administered to the person;
generating a cognitive function score for the person by comparing the first information with second information concerning a group of people to whom the cognitive test has been administered;
converting the cognitive function score to a value in an index comprising a range of values, wherein a first portion of the range corresponds to a cognitively impaired zone, a second portion of the range corresponds to a cognitively normal zone, and a third portion of the range corresponds to a zone of uncertainty defined by a confidence interval centered on a mid-point of the index; and
providing the value in the index for the person;
wherein the generating is based on an orthogonal transformation that maximizes canonical correlation between rows and columns of a matrix corresponding to the first information concerning the person.

11. The computer-readable medium of claim 10, wherein the converting comprises:

determining an appropriate one of the zones for the person based on the cognitive function score and the confidence interval; and mapping the cognitive function score into the appropriate zone based on the portion of the range corresponding to the appropriate zone.

12. The computer-readable medium of claim 10, the operations comprising:

receiving third information concerning the person, the third information comprising one or more older cognitive function scores for the person, the one or more older cognitive function scores being separated from a newer cognitive function score by a time period;

calculating an expected change between the one or more older cognitive function scores and the newer cognitive function score based on an age of the person, the time period, and the second information; and identifying whether a change between the one or more older cognitive function scores and the newer cognitive function score falls outside the expected change.

13. The computer-readable medium of claim 12, wherein calculating the expected change comprises using one or more statistical estimation methods.

14. The computer-readable medium of claim 10, the operations comprising:

determining a cognitive function score cut-point based on data for the group of people to whom the cognitive test has been administered;

calculating the confidence interval centered on the cognitive function score cut-point, wherein the confidence interval is at least a 95% confidence interval;

determining a minimum cognitive function score for persons classified as impaired and a maximum cognitive function score for persons classified as normal; and calculating the third portion of the range based on the cognitive function score cut-point, the mid-point of the index, the confidence interval, and a difference between the maximum cognitive function score and the minimum cognitive function score.

15. The computer-readable medium of claim 14, wherein the converting comprises:

if the cognitive function score for the person falls below the confidence interval, mapping the cognitive function score into the first portion of the range based on the minimum cognitive function score and a lower end of the confidence interval;

if the cognitive function score for the person falls above the confidence interval, mapping the cognitive function score into the second portion of the range based on the maximum cognitive function score and a higher end of the confidence interval; and if the cognitive function score for the person falls on the confidence interval, mapping the cognitive function score into the third portion of the range based on the confidence interval.

16. The computer-readable medium of claim 14, wherein the confidence interval is at least a 98% confidence interval; the mid-point of the index comprises a numerical mid-point of the range, the range of values consists of numbers between zero and one hundred, inclusive, and the mid-point is fifty; and the cognitive test comprises a test of memory performance comprising multiple item recall trials including at least one immediate free recall trial and at least one delayed free recall trial, and the first information specifies which items were recalled and which items were not recalled by the person in the multiple item recall trials.

17. A system comprising:

a user interface device; and one or more computers operable to interact with the user interface device and to perform operations comprising:

receiving first information concerning a person, the first information specifying the person's responses, and lack thereof, for components of a cognitive test administered to the person;

generating a cognitive function score for the person by comparing the first information with second information concerning a group of people to whom the cognitive test has been administered;

converting the cognitive function score to a value in an index comprising a range of values, wherein a first portion of the range corresponds to a cognitively impaired zone, a second portion of the range corresponds to a cognitively normal zone, and a third portion of the range corresponds to a zone of uncertainty defined by a confidence interval centered on a mid-point of the index; and providing the value in the index for the person;

wherein the generating is based on an orthogonal transformation that maximizes canonical correlation between rows and columns of a matrix corresponding to the first information concerning the person.

18. The system of claim 17, wherein the converting comprises:

determining an appropriate one of the zones for the person based on the cognitive function score and the confidence interval; and mapping the cognitive function score into the appropriate zone based on the portion of the range corresponding to the appropriate zone.

19. The system of claim 17, the operations comprising:

receiving third information concerning the person, the third information comprising one or more older cognitive function scores for the person, the one or more older cognitive function scores being separated from a newer cognitive function score by a time period;

calculating an expected change between the one or more older cognitive function scores and the newer cognitive function score based on an age of the person, the time period, and the second information; and identifying whether a change between the one or more older cognitive function scores and the newer cognitive function score falls outside the expected change.

20. The system of claim 19, wherein calculating the expected change comprises using one or more statistical estimation methods.

21. The system of claim 17, the operations comprising:

determining a cognitive function score cut-point based on data for the group of people to whom the cognitive test has been administered;

calculating the confidence interval centered on the cognitive function score cut-point, wherein the confidence interval is at least a 95% confidence interval;

determining a minimum cognitive function score for persons classified as impaired and a maximum cognitive function score for persons classified as normal; and calculating the third portion of the range based on the cognitive function score cut-point, the mid-point of the index, the confidence interval, and a difference between the maximum cognitive function score and the minimum cognitive function score.

22. The system of claim 21, wherein the converting comprises:

if the cognitive function score for the person falls below the confidence interval, mapping the cognitive function score into the first portion of the range based on the minimum cognitive function score and a lower end of the confidence interval;

if the cognitive function score for the person falls above the confidence interval, mapping the cognitive function score into the second portion of the range based on the maximum cognitive function score and a higher end of the confidence interval; and if the cognitive function score for the person falls on the confidence interval, mapping the cognitive function score into the third portion of the range based on the confidence interval.

23. The system of claim 21, wherein the confidence interval is at least a 98% confidence interval; the mid-point of the index comprises a numerical mid-point of the range, the range of values consists of numbers between zero and one hundred, inclusive, and the mid-point is fifty; and the cognitive test comprises a test of memory performance comprising multiple item recall trials including at least one immediate free recall trial and at least one delayed free recall trial, and the first information specifies which items were recalled and which items were not recalled by the person in the multiple item recall trials.

24. The system of claim 17, wherein the one or more computers comprise a server operable to interact with the user interface device through a data communication network, and the user interface device is operable to interact with the server as a client.

* * * * *